(12) United States Patent
Knezovic (10) Patent No.: US 7,326,045 B2
(45) Date of Patent: Feb. 5, 2008

(54) SYSTEM FOR RELEASING MOLDED PART FROM ENTRAPPING CORE RINGS

(75) Inventor: Jerko Knezovic, Brampton (CA)

(73) Assignee: Top Grade Molds Ltd., Mississauga, Ontario (CA)

( * ) Notice: Subject to any disclaimer, the term of this patent is extended or adjusted under 35 U.S.C. 154(b) by 228 days.

(21) Appl. No.: 11/099,393

(22) Filed: Apr. 5, 2005

(65) Prior Publication Data
US 2005/0220929 A1    Oct. 6, 2005

Related U.S. Application Data

(60) Provisional application No. 60/558,983, filed on Apr. 5, 2004.

(51) Int. Cl.
*B29C 45/44* (2006.01)
(52) U.S. Cl. .............. 425/441; 425/436 RM; 425/556; 425/DIG. 58
(58) Field of Classification Search ........... 425/441, 425/444, 436 RM, DIG. 58, 556
See application file for complete search history.

(56) References Cited

U.S. PATENT DOCUMENTS

| | | | | |
|---|---|---|---|---|
| 4,383,819 A | * | 5/1983 | Letica | 425/577 |
| 4,570,897 A | * | 2/1986 | Von Holdt | 249/144 |
| 4,832,307 A | * | 5/1989 | Watanabe et al. | 249/63 |
| 4,889,480 A | * | 12/1989 | Nakamura et al. | 425/577 |
| 5,824,256 A | * | 10/1998 | Ballester | 264/318 |
| 6,416,315 B1 | * | 7/2002 | Ciccone | 425/556 |
| 6,604,934 B2 | * | 8/2003 | Ciccone et al. | 425/556 |

* cited by examiner

*Primary Examiner*—Tim Heitbrink
*Assistant Examiner*—Emmanuel S Luk
(74) *Attorney, Agent, or Firm*—Hodgson Russ LLP (57) ABSTRACT

Core portion of injection mold forms a central boss. An annular trough surrounds the central boss, the boss forming an inner trough wall. An annular core ring is positioned in the annular trough adjacent the inner trough wall. A plurality of slide segments are attached coaxially adjacent the annular core ring toward the cavity portion, being laterally slidable relative to the core ring, the slide segments defining in part the rim of the molded container. A centering ring is secured to and protrudes from the cavity portion toward the core portion, positioned such that in said closed position the centering ring engages the slide segments to prevent outward lateral movement of the slide segments. As the centering ring disengages the slide segments upon opening of the mold, the slide segments are free to move outwardly laterally as the ring and slide segments are withdrawn from the molded part.

21 Claims, 9 Drawing Sheets

SYSTEM FOR RELEASING MOLDED PART FROM ENTRAPPING CORE RINGS

This application claims benefit of application Ser. No. 60/558,983 filed Apr. 5, 2004.

FIELD OF THE INVENTION

This invention relates to injection molds, and in particular to a system that helps release the molded part from entrapping core rings, and reduces wear of sliding parts.

BACKGROUND OF THE INVENTION

Injection molds used to form plastic containers comprise a core portion and a cavity portion movable relative to each other. When the core and cavity portions are pressed together a mold cavity is formed therebetween in the shape of the molded container into which molten material may be injected to form the container. The mold cavity may be defined by a central boss of the core portion which forms the inner surface of the container and the mating cavity portion which forms the outer portion of the container. The core portion forms an annular trough surrounding the central boss. Typically, the container has an enlarged rim. In known mold systems, steel core ring systems or collets are positioned in the trough and define in part the enlarged rim of the container. These steel rings are typically connected to an ejector system within the core which acts to separate the rings from the molded container during ejection of the container from the mold. The rim may include undercut portions formed by inwardly disposed grooves in the rings, which may cause some resistance to removal of the rim of the container from the rings during ejection. The rim often includes an undercut portion formed by an inwardly disposed groove in the core, which tends to cause substantial additional resistance to removal of the molded container from the mold.

A difficulty with these collet or ring type molds is that they include a number of sliding components, such as the rings against the core boss, which are prone to wear, particularly during the ejection process.

In known mold machines, typically the machine knockout rods are employed to release the molded parts. A known design of two-stage ejector system can be used for container rims with undercuts gripping into core rings, the two-stage ejection using the machine knockout rods to first extend for release, then retract in place for a new mold cycle. However, container rims having undercuts into the core require all surrounding core rings or slides to retract to release the rim such that the rim is free to flex outward and release its grip on the core when activated to eject by core air functions. The knockout rods cannot be used in such cases, as their safety features prevent them from first retracting, then extending. Furthermore, the force of the knock-out rods is far smaller than the injection force, meaning that the knock-out rods cannot effectively assist in holding the core ring system in place during injection. Thus, a system which provides improved assistance for holding the core ring system during injection is desirable.

SUMMARY OF THE INVENTION

It is an object of the invention to provide a mold including an improved system for release of the molded part from the core rings during the ejection process and for reducing wear of sliding parts.

It is a further object of the invention to utilize the clamping force of the injection machine to assist closing and holding the core ring into place during mold cycles.

In accordance with an aspect of the invention there is provided a system for the improved release of a molded container from a core ring in an injection mold comprising a core portion and a cavity portion movable relative to each other between an open position whereat said core and cavity portions are separated, and a closed position whereat the core and cavity portions are pressed together to form therebetween a mold cavity in the shape of the molded container into which molten material may be injected to form said molded container; the core portion forming a central boss forming the inner surface of the container and the cavity portion forming the outer portion of the container; the core portion forming an annular trough surrounding the central boss, the boss forming an inner trough wall; an annular core ring positioned in the annular trough of the core portion adjacent the inner trough wall; a plurality of slide segments attached coaxially adjacent the annular core ring toward the cavity portion, the slide segments being positioned adjacent the inner trough wall and being outwardly laterally slidable relative to the core ring, said slide segments defining in part the rim of the molded container; a centering ring protruding from the cavity portion toward the core portion, positioned such that in said closed position the centering ring engages the slide segments to position them adjacent the inner trough wall and prevent outward lateral movement of the slide segments relative to the core ring; a ejector system, such as an ejector plate system, connected to the core ring which pulls the core ring and attached slide segments towards the core portion as the mold opens from the closed position to separate the slide segments from the molded container, and once the centering ring disengages the slide segments upon opening of the mold, the slide segments are free to move outwardly laterally as the ring and slide segments are withdrawn from the molded part so as to facilitate separation of the slide from the inner trough wall during ejection, and thereby reduce wear of these parts during said mold opening.

In accordance with a further aspect of the invention a plurality of push pins extend between the cavity portion axially through the core portion each into a guide block pocket defined in a bottom plate attached to the bottom of the core portion, said guide block pockets each comprising a guide block including a swivel arm pivotally mounted at a pivot point within the guide block, the swivel arm having a first end positioned to engage said push pin and an opposing second end on the opposite side of the pivot point positioned to engage core ring, preferably via said ejector plates, whereby as the mold closes, said cavity portion engages said push pin and pushes the push pin to urge the first end of the swivel arm away from the cavity portion into the guide block pocket causing the second end to urge core ring and slide segments, by means of urging the ejector plate system and connected posts and/or support pins upward toward the cavity portion to press the core ring and slide segments against the cavity side to provide further force to hold the ring and slide segments in position during mold injection.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF EXAMPLE EMBODIMENTS OF THE INVENTION

With reference to the drawings above mentioned, the following is a detailed description of an example of an embodiment of the invention for a system that allows release of a molded part, such as a container with an enlarged annular rim from the entrapping core ring system. In accordance with a further aspect of the invention, the following will describe an embodiment wherein the clamping force of the injection machine is employed to close and hold the core ring into place during mold cycles. The drawings show an embodiment of the invention used with a single face container mold. It should be understood however, that the present invention may be utilized with stack mold systems.

Figure 1:
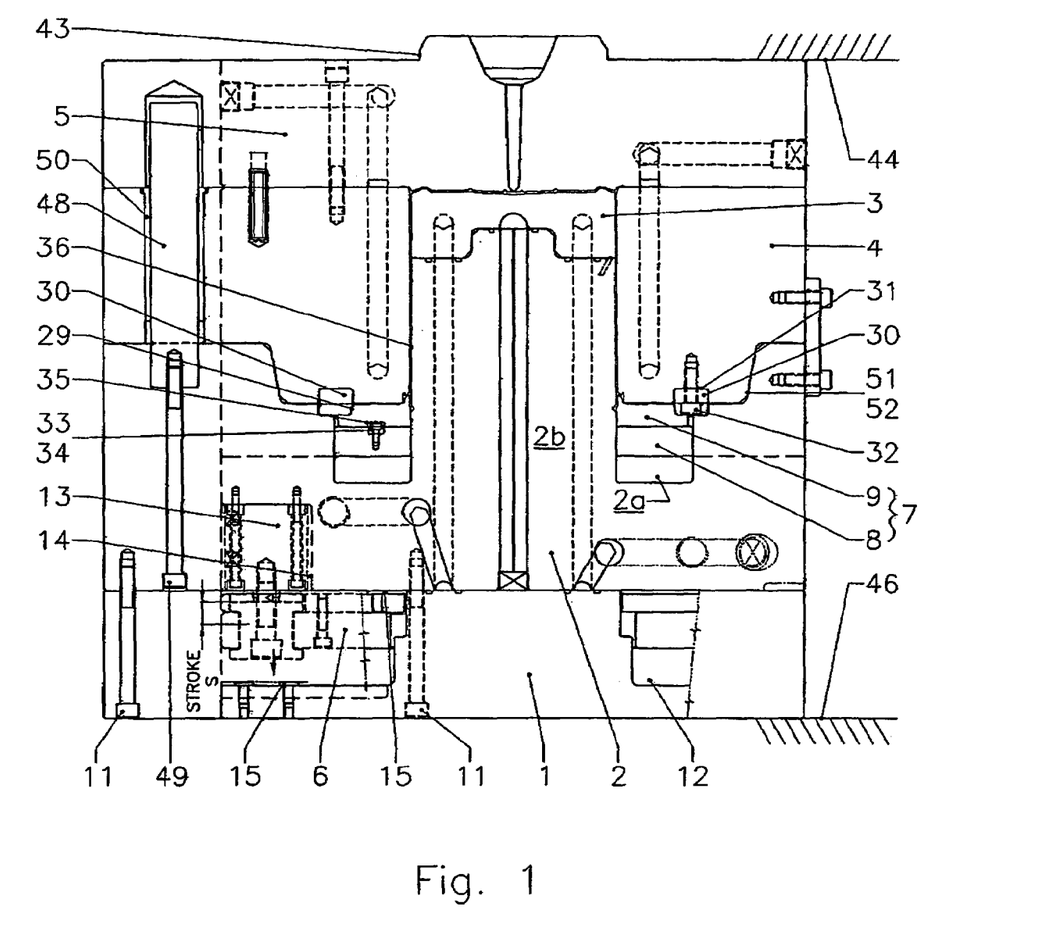
FIG. 1 is a cross section view along a vertical plane along a first diagonal through the center of an embodiment of a mold shown with mold closed.
Figure 2:
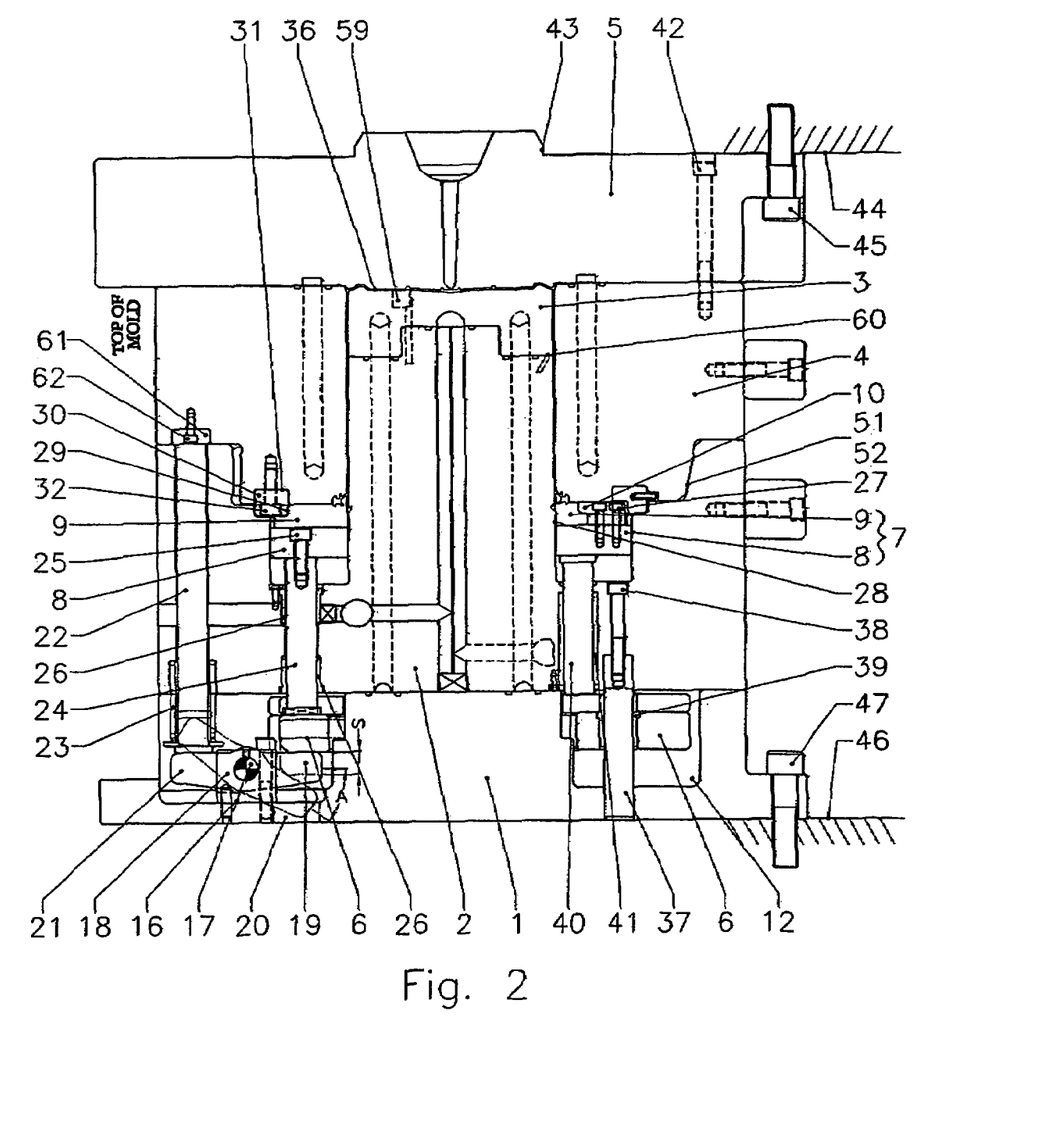
FIG. 2 is a cross section view along a vertical plane along a second diagonal through the center of the embodiment of the mold shown with mold closed.
Figure 3:
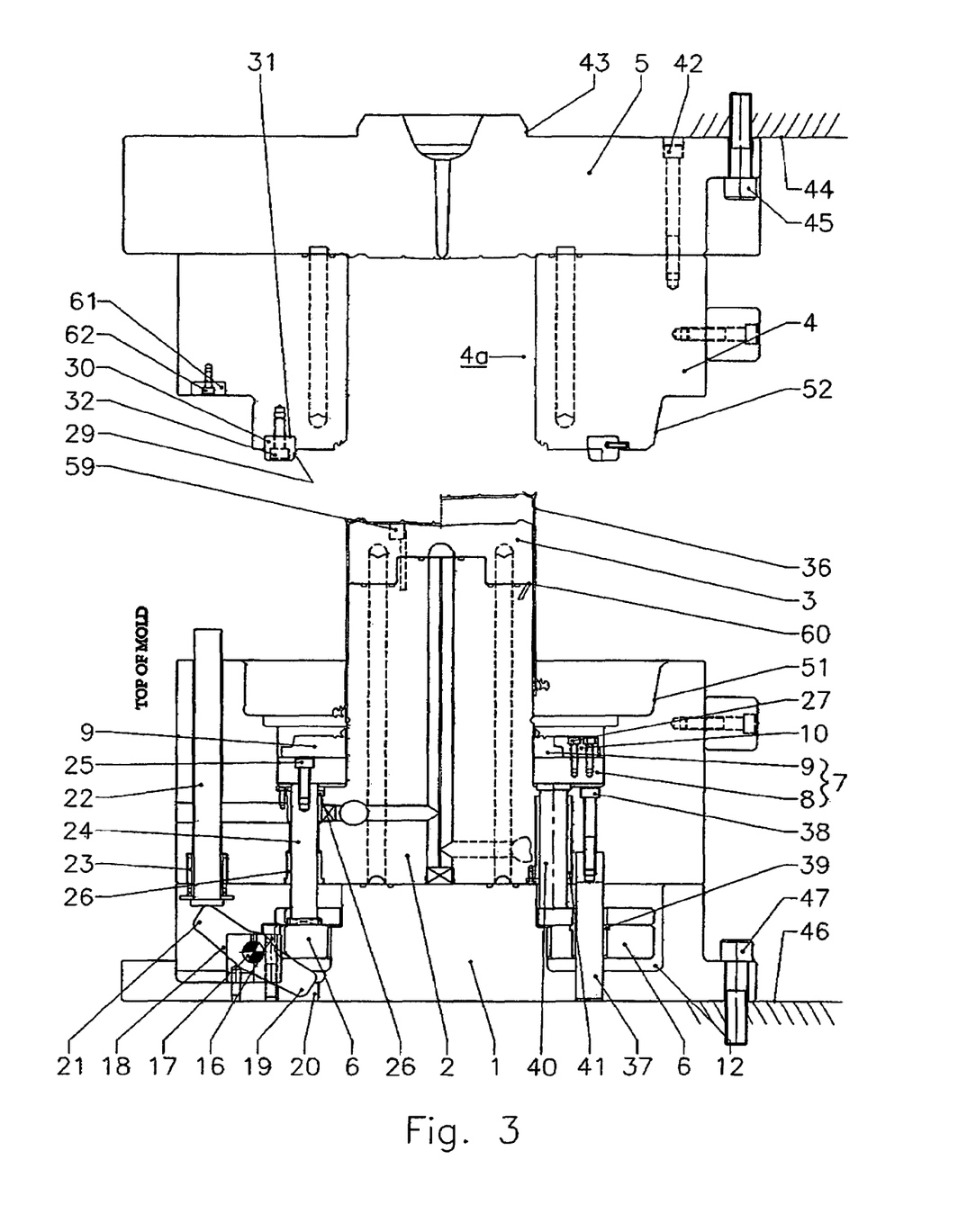
FIG. 3 is a cross section view along a vertical plane along the second diagonal through the center of the embodiment of the mold, shown with mold open.
Figure 4:
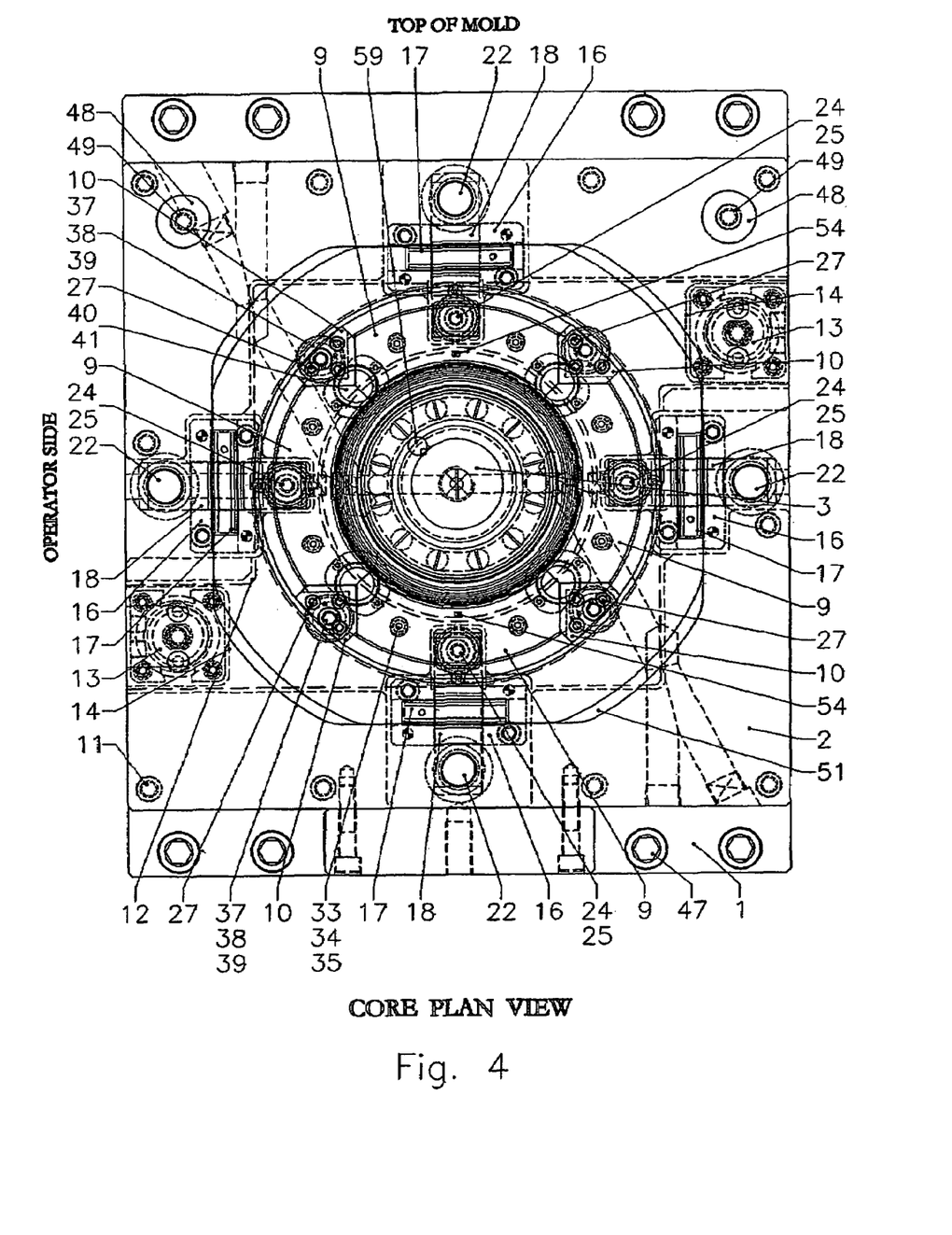
FIG. 4 is a plan view of the core side of the embodiment of the mold of FIG. 1.
Figure 5:
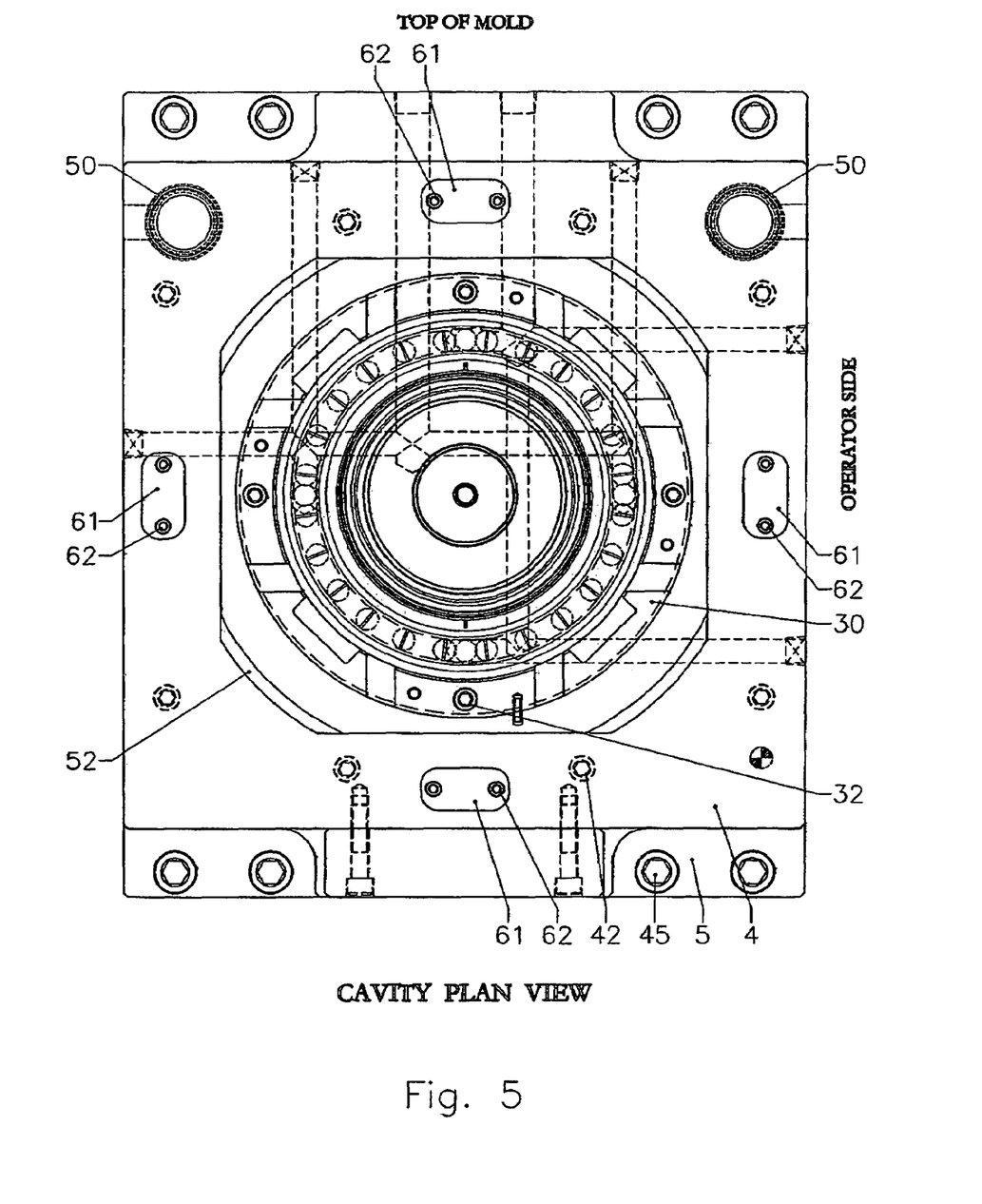
FIG. 5 is a plan view of the cavity side of the embodiment of the mold.
Figure 6:
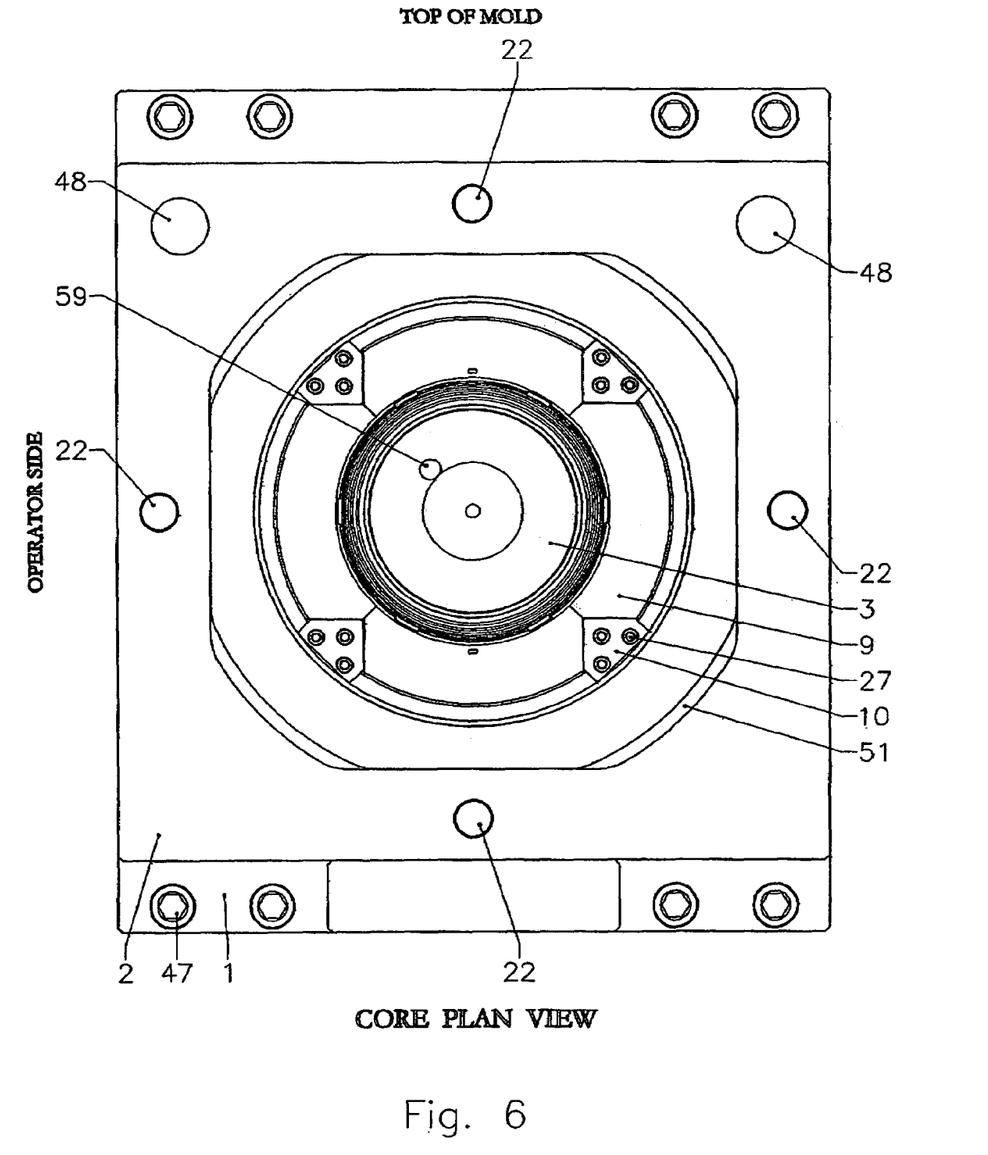
FIG. 6 is a simplified plan view of the core side of the embodiment of the mold.
Figure 7:
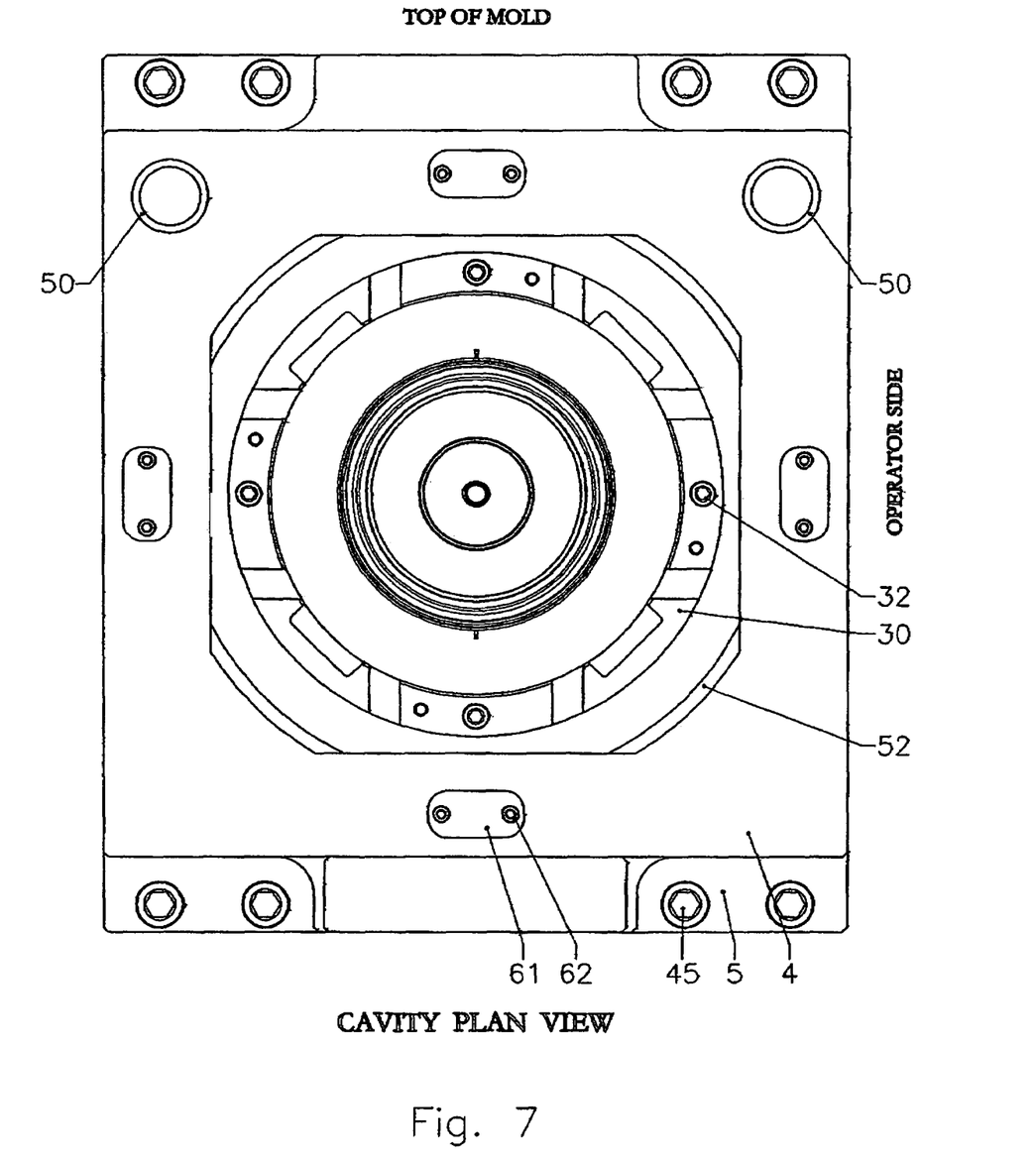
FIG. 7 is a simplified plan view of the cavity side of the embodiment of the mold.

With reference to FIGS. 1, 2 and 3, the mold in accordance with an example of the invention consists of a core portion comprising bottom plate (1), core block (2), core cap (3) and a cavity portion comprising cavity block (4), top plate (5). The core portion further comprises an ejector system such as ejector plate system (6), core ring system (7) made of an annular core ring (8) and slides (also referred to as slide segments) (9) located and held coaxially adjacent the core ring in limited sliding engagement (8) by slide guides (10). The core block (2) defines an annular trough (2a) located around a central boss (2b) of the core block. As can be seen in FIG. 3, cavity block (4) includes a cavity (4a) defining the outer surface of the molded part, while the boss (2b) of core block (2) defines the inner surface of the container, the boss forming an inner trough wall (28). It should be understood that the above-mentioned components would be repeated twice on a stack mold, both stationary side and moving side. In a typical stack mold design, the top plate becomes the manifold plate. Also, some of the non-related components that may be shown on the design will not be discussed since they are common on any style of mold. Further components will be discussed below as necessary.

Core block (2) is secured to bottom plate (1) with bolts (11), and core cap (3) is secured to core block (2) (securing means not shown to simplify views). The core ring system (7) is made of an annular core ring (8) and a number of slides (also referred to as slide segments) (9) coaxially located adjacent the core ring positioned toward the cavity block side. The slides (9) are slidably held onto the round core ring (8) by slide guides (10). In the embodiment shown, the slides (9) are segmented to form four slides (9), held by four slide guides (or gibs) (10) positioned on an outer annular portion of the ring, but it should be understood that slides (9) may be segmented into more pieces. As shown in FIG. 2, the round core ring (8) is secured to an ejector system such as ejector plate system (6) with ejector posts (24) and bolts (25). In the example shown, ejector posts (24) are guided in core block (2) by bushings (26). Slides (9) are not rigidly secured to round core ring (8), but are held in contact with the core ring (8) by the slide guides (10) in a manner which allows a limited amount of sliding of the slides relative to the ring, as will be discussed below. Slide guides are secured to round core ring (8) with bolts (27).

When mold is in the closed position, (as is seen in FIGS. 1 and 2), slides (9) are centered annularly into position by inner trough wall (28) of core block boss (2a) on the inner side and by the tapered surface (29) of centering ring (30) on the outer annular side. In the embodiment shown, the ejector system is an ejector plate system (6) which is centered in pocket (12) in bottom plate (1), and is allowed to move a stroke distance S during the ejection of the molded container (36) upon opening of the mold once the molded container (36) is formed. In the embodiment described, the ejector plate system (6) is actuated by hydraulic cylinders (13) mounted in pockets (14) in core block (2), but it should be understood that other ejector plate activating means could be used without departing from the scope of this invention. Stop pins (15) are used on both side of ejector plate system (6) to limit its stroke.

Also mounted in pockets (12) in bottom plate (1) are a number of evenly spaced guide blocks (16) (four shown in this embodiment, but more or less may be used). A push pin (22) extends axially from each guide block pocket through the core portion to engage the cavity portion in the closed position. Radially inwardly adjacent to each guide block (16) there is a pocket (20) in the bottom plate (1). Each of these guide blocks (16) holds a dowel pin (17) which supports a swivel arm (18), which pivots about the dowel pin.

Opposite each push pin (22) of the core side, a pressure pad (61) is installed in cavity block (4) and secured with bolts (62). When mold closes for a new cycle, pressure pad (61) forces push pin (22) to push onto end (21) of swivel arm (18). This causes the swivel arm (18) to pivot about axis of dowel pin (17), and makes opposite end (19) of swivel arm (18) push the ejector plate system (6) to extend toward the core block (2). This movement is transferred, through ejector posts (24) and support pins (40), to core ring system (7), making core ring system press against the cavity side and move in position for a further mold injection cycle. As long as the mold is closed for injection, the core ring system will be held in place by the clamping force of the injection machine. Thus, in accordance with a novel aspect of this invention the force that closes the mold (provided by the injection press) is transmitted via the push pin through the swivel arm to also close the core ring system (7) and hold it in position during injection cycles. This results in appropriately timed motion of core ring system (7) in relation with mold cycles, eliminating the need for additional synchronizing systems.

In accordance with a further aspect of the invention, in the embodiment shown, hydraulic cylinders (13) comprising a cylinder housing secured to the core portion and a movable piston, extend to actuate ejector plate system (6) to draw the ring (8) and slides (9) down away from the cavity side by means of ejector posts (24) connecting to ring (8) by bolts (25) to separate from the molded part (36) upon opening of the mold. This in turn pushes end (19) of swivel arm (18) deeper into pocket (20) in bottom plate (1). The opposite end (21) of swivel arm (18) is positioned to lift push pin (22) as end (19) is pushed downwardly by compressing spring (23). Spring (23) is used to counter the force of the ejector plate system (6) on the swivel arm (18). Note: Angle of rotation A of the swivel arm (18) is influenced by stroke S, geometry of ejector plate system (6) and of swivel arm (18), all of which may be varied as desired.

In the example embodiment of an aspect of the invention, centering ring (30) is mounted in groove (31) in cavity block (4) with bolts (32). When mold opens, as shown in FIG. 3, centering ring (30) retracts with cavity block (4). Once the cavity block with centering ring (30) is retracted, slides (9) are able to slide laterally peripherally outwardly (the direction of arrow P in FIGS. 9 and 11) away from surface (28) of core block (2) upon ring (8), however, movement of each slide (9) in the peripheral outward direction is limited by posts (33), secured to core ring (8) with bolts (34). Posts (33) are partially protruding above surface of round core ring (8) into slotted pockets (35) on back surface of slides (9). By allowing such outward lateral movement of the slides (9), wear of parts from movement that occurs simultaneously with the retraction of the ejector plate system (6) is reduced. As can be seen in FIGS. 4 and 8 to 11, slotted pockets (35) are formed with slight ovality, extending in an outward lateral peripheral direction. The ovality of the pockets (35) allows the slides (9) to move relative to the posts (33) during the ejection process. The peripheral outward oriented ovality of the pockets allows the post (33) to move within the pocket (35), and thereby allows the slides (9) to move outwardly peripherally from surface (28) during retraction of ejector plate system to form a slight gap (37) therebetween. The ovality of the pocket (35) need be sufficient to allow the slide to be spaced from surface (28) during ejector plate system retraction. It should be understood that the outward peripheral ovality of the slotted pockets (35) may be varied to accommodate desired relative movement for different molded parts. In fact, the shape of the pockets (35) may not necessarily be oval, but may rather be any elongate lateral periperhal outward orientation, so long as it accommodates outward peripheral movement of the slide (9) relative to surface (28) to form gap (37) thereby reducing wear on these parts.

Guide pins (37), secured to core block (2) with bolts (38) at one end and having an opposite end centered in the bottom plate, together with bushings (39) installed in ejector plate system (6), guide movement of ejector plate system (6) in reference to core block (2). Counterforce support pins (40), guided by bushings (41) installed in core block (2), hold round core ring (8) firmly in place during injection pressure (i.e. they prevent the round core ring (8) from deflecting when subjected to injection pressure).

Cavity block (4) is secured to top plate (5) with bolts (42). Top plate (5) has a central protrusion (43) at the back, for centering in the stationary platen (44) of the injection machine. Top plate is secured to the stationary platen (44) with bolts (45). Similarly, bottom plate (1) is secured to the moving platen (46) of the injection press with bolts (47). Movement of core half in reference to cavity half is guided by two or more leader pins (48). Each leader pin (48) is secured to core block (2) with bolt (49), and is guided by bushing (50) mounted in cavity block (4). Centering between core and cavity halves (when mold closes) is achieved by tapered surfaces (51) of core block (2) and (52) of cavity block (4).

A generic type of cooling, using vertical cooling lines running somewhat parallel to the molding area, is shown on both mold halves but will not be explained here in more detail. It should be understood that any other type of cooling is possible, depending on mold geometry and systems integrated, and that this cooling design was shown as an example.

Figure 8:
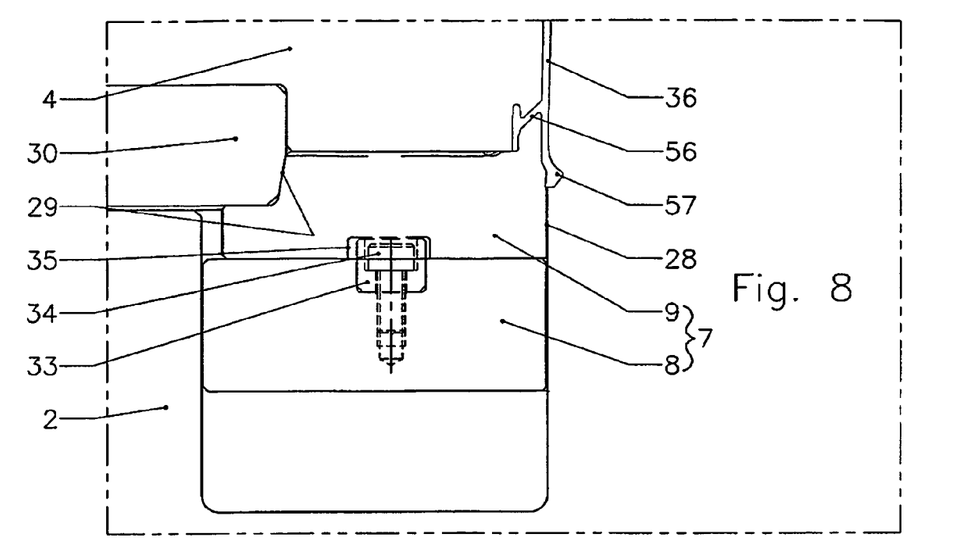
FIG. 8 is an enlarged portion of FIG. 1, showing an embodiment of the core ring system with mold closed.
Figure 9:
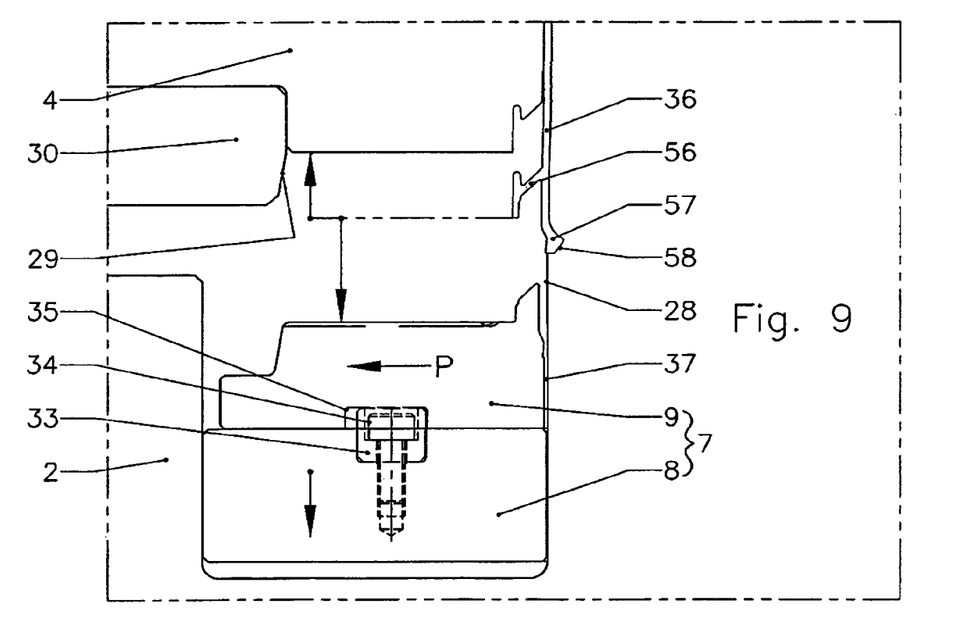
FIG. 9 is an enlarged portion of FIG. 1, showing an embodiment of the core ring system with mold partially opened.
Figure 10:
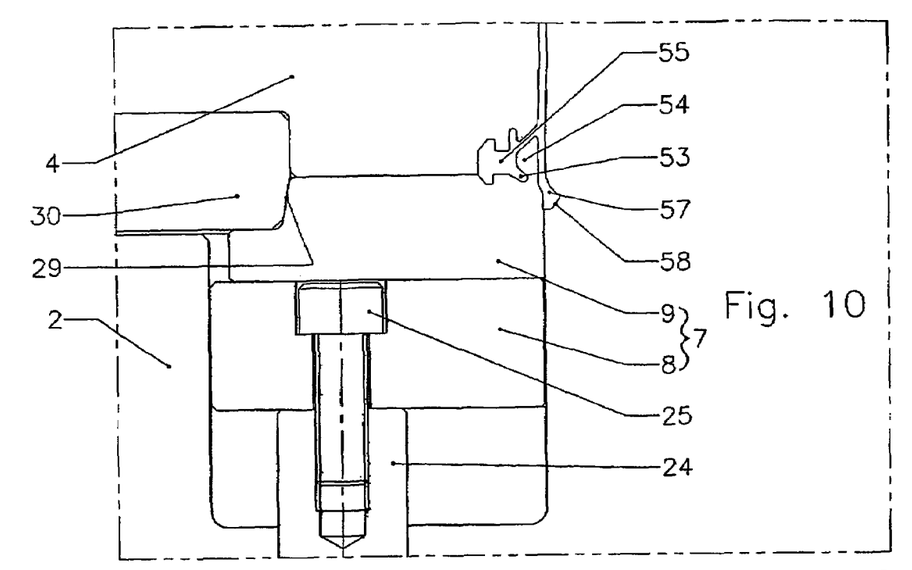
FIG. 10 is an enlarged portion of FIG. 2, showing an embodiment of the core ring system with mold closed.
Figure 11:
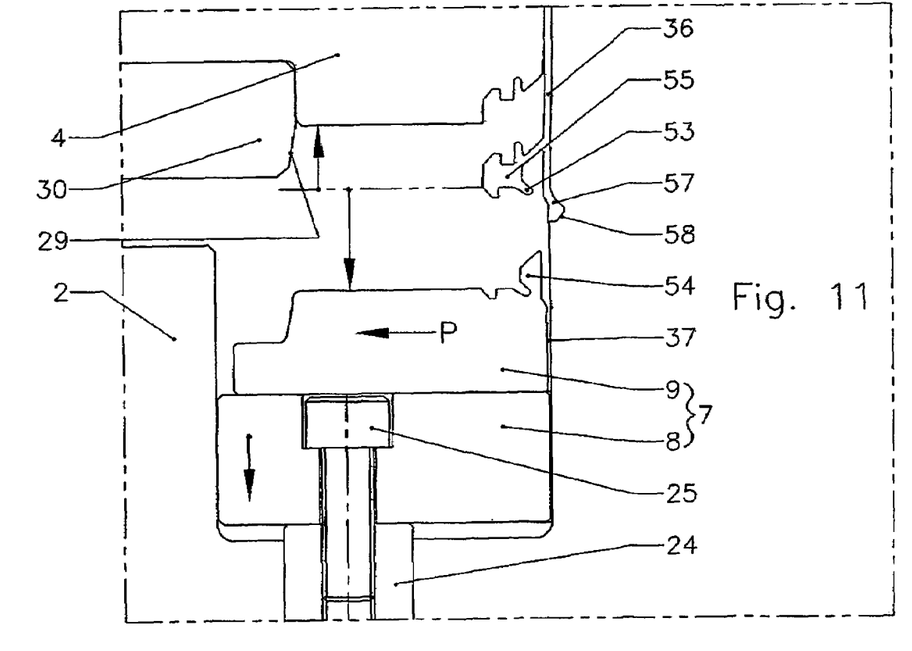
FIG. 11 is an enlarged portion of FIG. 2, showing an embodiment of the core ring system with the mold partially opened.

With reference to FIGS. 1, 2, 3 and 8 through 11, when ejector plate system (6) retracts and mold opens, ring (8) and slides (9) are pulled back with the ejector plate system, releasing their hold on molded part (36). In sections shown in FIGS. 10 and 11, portion (53) of molded part (36) grips portion (54) of slides (9). Portions (53) flex temporarily outwardly to release the slides (9), then return inwardly as shown in FIG. 11. The embodiment described here has two such portions (53), corresponding to the two slides (9) located on the vertical centerline of the mold. Sections of molded part (36) as shown in FIGS. 2, 10 and 11, form the two handles (55) of the container being injected, while sections shown in FIGS. 1, 8 and 9 represent the rim (56) all around.

After slides (9) release rim (56) and handles (55) and are retracted sufficiently far below undercut (57), molded part (36) must be ejected off the core block (2). However, undercut (57) of molded part (36) grips all around into groove (58) of core block (2), resisting stripping. Air pressures of air poppet (59) applied at the bottom of the molded part (36), and of air vent (60) applied laterally inside the molded part (36), around the side, are used to break off resistance of undercut (57) from groove (58) of core block (2), and to force the container (36) off the core block (2). FIG. 3 illustrates the position of the container prior to being removed from the core block (the left portion of the illustrated container) and the position of the container after air pressures are applied to lift the container off the core block (the right portion of the container). With the slides (9) out of the way after retraction, rim (56) and handles (55), still warm from injection, will flex out to allow molded container (36) to slide off the core block (2), as shown on the right side of FIG. 3.

As will be apparent to those skilled in the art in the light of the foregoing disclosure, many alterations and modifications are possible in the practice of this invention without departing from the spirit or scope thereof.

The invention claimed is:

1. A system for the improved release of a molded container from entrapping core rings in an injection mold comprising:
   a core portion and a cavity portion movable relative to each other between an open position whereat said core and cavity portions are separated, and a closed position whereat the core and cavity portions are pressed together to form therebetween a mold cavity in the shape of the molded container into which molten material may be injected to form said molded container; the core portion forming a central boss forming the inner surface of the container and the cavity portion forming the outer portion of the container; the core portion forming an annular trough surrounding the central boss, the boss forming an inner trough wall;

an annular core ring positioned in the annular trough of the core portion adjacent the inner trough wall;

a plurality of slide segments attached coaxially adjacent the annular core ring toward the cavity portion, the slide segments being positioned adjacent the inner trough wall and being outwardly laterally slidable relative to the core ring, said slide segments defining in part the rim of the molded container;

a centering ring protruding from the cavity portion toward the core portion, positioned such that in said closed position the centering ring engages the slide segments to position them adjacent the inner trough wall and prevent outward lateral movement of the slide segments relative to the ring;

a ring ejector system connected to the core ring which pulls the core ring and attached slide segments towards the core portion as the mold opens from the closed position to separate the slide segments from the molded container, and once the slide segments become disengaged upon opening of the mold, the slide segments are free to move outwardly laterally as the ring and slide segments are withdrawn from the molded part so as to facilitate separation of the slide segments from the inner trough wall during ejection, and thereby reduce wear of these parts during said mold opening.

2. A system as recited in claim 1 wherein the slides are slidably secured to said core ring toward the cavity side thereof by slide guides fastened to the core ring on an outer annular portion thereof, said slide guides securing the slide segments to the core ring while allowing limited lateral outward sliding movement of the slide segments relative to the ring.

3. A system as recited in claim 1 wherein said slide guides are bolted to the core ring.

4. A system as recited in claim 1 wherein each said slide segment includes at least one downward pocket into which a mating post protruding from said core ring extends to position each slide on said core ring, said pocket sized to facilitate limited laterally outward movement of the slide segment relative to the post and core ring during ejection.

5. A system as recited in clam 4 wherein said downward pocket is ovally shaped in a lateral outward orientation so as to allow said limited outward lateral movement of the slide segments relative to the posts during ejection.

6. A system as recited in claim 4 wherein each said slide segment includes a pair of said pockets.

7. A system as recited in claim 1 wherein the rim of the container is enlarged and includes an undercut extending into the slide formed by a groove in the slide segments.

8. A system as recited in claim 1 wherein the centering ring includes a tapered surface which engages an outer annular portion of the slide segments in the closed position to prevent sliding in the closed position.

9. A system as recited in claim 1 wherein the ejector system comprises an ejector plate system comprising ejector plates positioned within a pocket of a bottom plate of the core portion, said ejector plates being connected to the core ring by axially extending ejector posts, said ejector plates being actuated by actuation means to pull the core ring and attached slide segments by means of said posts away from the cavity portion during opening of the mold and thereby separate the slide segments from the molded container.

10. A system as recited in claim 9 wherein said actuation means comprises a hydraulic cylinder comprising a cylinder housing secured to the core portion and a piston moveable within said housing, said piston being attached to the ejector plates, wherein upon actuation the piston extends from the cylinder housing and draws the ejector plates and connected posts, core ring and slide segments in a direction away from the cavity portion.

11. A system as recited in claim 9 wherein said ejector system posts comprise ejector posts connected to plates which pull the core ring away from the cavity side during opening of the mold as the ejector plates are actuated and which further includes counterforce pins which act to press core ring in position in the closed position.

12. A system as recited in claim 9 wherein a plurality of guide pins extend toward the cavity portion axially through the core portion each adjacent to a guide block mounted in a pocket in the bottom plate, each said guide block including a swivel arm pivotally mounted at a pivot point within the guide block, the swivel arm having a first end positioned to engage said push pin and an opposing second end on the opposite side of the pivot point positioned to engage said ejector plates, whereby as the mold closes, said cavity portion engages said push pin and pushes each push pin to urge the first end of the swivel arm away from the cavity portion into the bottom plate pocket causing the second end to urge the ejector plates upward toward the cavity portion and cause said ejector posts to press the core ring and slide segments against the cavity side to provide further force to hold the core ring and slide segments in position during mold injection.

13. A system as recited in claim 12 wherein a bottom end of each push pin engages the first end of the swivel arm.

14. A system as recited in claim 13 wherein each push pin includes a compression spring at the end thereof to counter the force of the ejector system on the swivel arm as the ejector system pushes the second end of the swivel arm down as the mold is opened.

15. A system as recited in claim 12 wherein a pressure pad positioned on the cavity side is positioned such that as the mold closes, said pressure pad forces each push pin to push said first end of swivel arm downward away from the cavity side, thereby causing the swivel arm to pivot and cause the second end of the swivel arm to push the ejector plate system toward the cavity side to cause said posts to press the ring and slide segments in position.

16. A system as recited in claim 12 wherein said swivel arm is pivotally mounted by means of a dowel pin within said guide block.

17. An injection mold comprising:

a core portion and a cavity portion movable relative to each other between an open position whereat said core and cavity portions are separated, and a closed position whereat the core and cavity portions are pressed together to form therebetween a mold cavity in the shape of the molded container into which molten material may be injected to form said molded container; the core portion forming a central boss forming the inner surface of the container and the cavity portion forming the outer portion of the container; the core portion forming an annular trough surrounding the central boss, the boss forming an inner trough wall; at least one axially oriented push pin extending from the cavity portion within the core portion into a pocket of a bottom plate attached to said core portion, said pocket housing a guide block;

an annular core ring system positioned in the annular trough of the core portion adjacent the inner trough wall defining in part the rim of the container;

said guide block including a swivel arm pivotally mounted to the guide block, the swivel arm having a first end positioned to engage said push pin, and an opposing second end on the opposite side of the pivot point positioned to engage said core ring system, such that as the mold closes said cavity portion engages the push pin and presses the push pin to urge the first end of the swivel arm away from the cavity portion causing the second end of the swivel arm to urge said core ring system upward toward the cavity portion to provide further force to hold the core ring system in position during mold injection.

18. An injection mold as recited in claim 17 wherein said swivel arm is pivotally mounted by means of a dowel pin within said block pocket.

19. An injection mold as recited in claim 17 wherein the core ring system includes and ejector plate system comprising ejector plates positioned within the bottom plate pocket, attached to rings of the core ring system by ejector posts, actuatable to pull said rings away from the cavity portion and separate said rings from the molded container during opening of the mold.

20. An injection mold as recited in claim 17 comprising four said push pins positioned equidistantly around the mold.

21. A system as recited in claim 17 comprising four said push pins positioned equidistantly around the mold.

* * * * *